United States Patent
Ganesh et al.

(10) Patent No.: US 10,742,609 B2
(45) Date of Patent: *Aug. 11, 2020

(54) REDUCTION AND ACCELERATION OF A DETERMINISTIC FINITE AUTOMATON

(71) Applicant: Palo Alto Networks, Inc., Santa Clara, CA (US)

(72) Inventors: Subramani Ganesh, Sunnyvale, CA (US); Sidong Li, Saratoga, CA (US); Lei Chang, San Jose, CA (US)

(73) Assignee: Palo Alto Networks, Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/127,086

(22) Filed: Sep. 10, 2018

(65) Prior Publication Data

US 2019/0007374 A1 Jan. 3, 2019

Related U.S. Application Data

(63) Continuation of application No. 15/141,729, filed on Apr. 28, 2016, now Pat. No. 10,110,563.

(51) Int. Cl.
*G06F 17/00* (2019.01)
*H04L 29/06* (2006.01)
*G06F 16/22* (2019.01)
*G06F 16/903* (2019.01)

(52) U.S. Cl.
CPC ...... *H04L 63/0263* (2013.01); *G06F 16/2237* (2019.01); *G06F 16/2282* (2019.01); *G06F 16/90344* (2019.01); *H04L 63/06* (2013.01); *H04L 63/20* (2013.01)

(58) Field of Classification Search
CPC ............ G06F 16/2237; G06F 16/2282; G06F 16/90344; G06F 16/9024; H04L 63/0263; H04L 63/06; H04L 63/20; H04L 63/0254
See application file for complete search history.

(56) References Cited

U.S. PATENT DOCUMENTS

| | | | |
|---|---|---|---|
| 7,710,988 B1 * | 5/2010 | Tripathi | ............... H04L 63/0227 370/395.52 |
| 2003/0065800 A1 * | 4/2003 | Wyschogrod | ........... H04L 29/06 709/230 |

(Continued)

OTHER PUBLICATIONS

Abuhmed et al., A Survey on Deep Packet Inspection for Intrusion Detection Systems, Korea Electronics and Telecommunication Research Institute, from Magazine of Korea Telecommunication Society vol. 24 No. 11 pp. 25-36 Nov. 2007.

(Continued)

*Primary Examiner* — Farid Homayounmehr
*Assistant Examiner* — Lizbeth Torres-Diaz
(74) *Attorney, Agent, or Firm* — Van Pelt, Yi & James LLP

(57) ABSTRACT

Techniques for reduction and acceleration of a deterministic finite automaton (DFA) are disclosed. In some embodiments, a system, process, and/or computer program product for reduction and acceleration of a DFA includes receiving an input value; performing a reduced deterministic finite automaton lookup using a lookup key, wherein the lookup key comprises a current state and the input value; and determining a next state based on the lookup key.

20 Claims, 10 Drawing Sheets

(56) References Cited

U.S. PATENT DOCUMENTS

| | | | |
|---|---|---|---|
| 2005/0238022 A1* | 10/2005 | Panigrahy | H04L 63/0254 370/392 |
| 2006/0101195 A1 | 5/2006 | Jain | |
| 2008/0034427 A1* | 2/2008 | Cadambi | H04L 63/1425 726/22 |
| 2010/0229238 A1* | 9/2010 | Ma | H04L 63/1416 726/23 |
| 2012/0072380 A1 | 3/2012 | Liu | |
| 2013/0086017 A1 | 4/2013 | Chao | |
| 2017/0277800 A1 | 9/2017 | Lucas | |

OTHER PUBLICATIONS

Aldwairi et al., Configurable String Matching Hardware for Speeding up Intrusion Detection, Department of Electrical and Computer Engineering, North Carolina State University, ACM Mar. 2005 pp. 99-107.

Author Unknown, DFA State Transition Table Compression, retrieved from http://stackoverflow.com/questions/29139162/dfa-state-transition-table-compression on Apr. 27, 2016.

Crosby et al., Denial of Service via Algorithmic Complexity Attacks, from Proceedings of the 12th USENIX Security Symposium, Washington, DC, Aug. 4-8, 2003.

Dharmapurikar et al., Deep Packet Inspection Using Parallel Bloom Filters, from IEEE Computer Society, Jan.-Feb. 2004, pp. 52-61.

Sidhu et al., Fast Regular Expression Matching using FPGAs, from FCCM 2001 Proceedings of the 9th Annual IEEE Symposium on Field-Programmable Custom Computing Machines, pp. 227-238, Washington, DC, Mar. 29, 2001-Apr. 2, 2001.

Tan et al., Bit-Split String-Matching Engines for Intrusion Detection and Prevention, ACM Mar. 2006, pp. 3-34.

* cited by examiner

| Current-State | Char-0x0-(next-state) | Char-0x1-(next-state) | ... | Char-0xFE-(next-state) | Char-0xFF-(next-state) |
|---|---|---|---|---|---|
| S0 | S19 | S1 | ... | S19 | S19 |
| S1 | S7 | S21 | ... | S22 | S7 |
| S2 | S11 | S197 | ... | S20 | S197 |
| ... | ... | ... | ... | ... | ... |
| S255 | S197 | S197 | ... | S197 | S197 |
| ... | ... | ... | ... | ... | ... |
| Sn | S20 | S100 | ... | S100 | S100 |

FIG. 4

| Current-State | Char-0x0 | Char-0x1 | ... | Char-0xFE | Char-0xFF |
|---|---|---|---|---|---|
| S0 | S19 | S1 | | S19 | S19 |
| S1 | S7 | S21 | | S22 | S7 |
| S2 | S11 | S197 | | S20 | S197 |
| ... | | | | | |
| S255 | S197 | S197 | | S197 | S197 |
| ... | | | | | |
| Sn | S20 | S100 | | S100 | S100 |

FIG. 5

REDUCTION AND ACCELERATION OF A DETERMINISTIC FINITE AUTOMATON

CROSS REFERENCE TO OTHER APPLICATIONS

This application is a continuation of co-pending U.S. patent application Ser. No. 15/141,729 entitled REDUCTION AND ACCELERATION OF A DETERMINISTIC FINITE AUTOMATON filed Apr. 28, 2016 which is incorporated herein by reference for all purposes.

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

FIG. 4 is a full representation of an example deterministic finite automaton table.

FIG. 5 is a full representation of the example deterministic finite automaton table that is modified to indicate valid next states and default next states in accordance with some embodiments.

DETAILED DESCRIPTION

Figure 1:
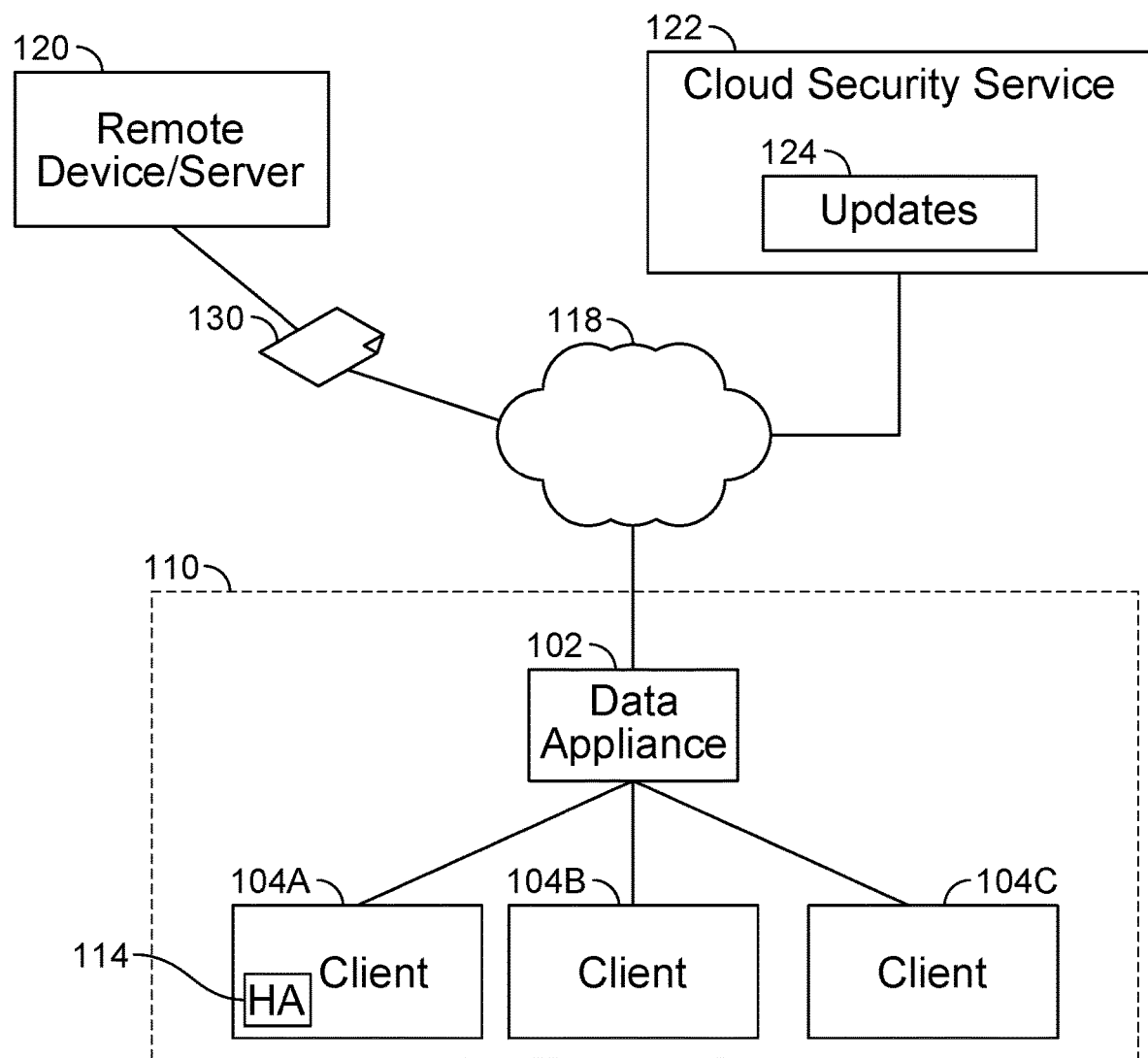
FIG. 1 is a functional diagram of a network architecture for a data appliance in accordance with some embodiments.

The invention can be implemented in numerous ways, including as a process; an apparatus; a system; a composition of matter; a computer program product embodied on a tangible computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as described herein).

Security devices (e.g., security appliances, security gateways, security services, and/or other security devices) can include various security functions (e.g., firewall, anti-malware, intrusion prevention/detection, proxy, and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., using application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content. In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls).

For example, Palo Alto Networks' next generation firewalls enable enterprises to identify and control applications, users, and content—not just ports, IP addresses, and packets—using various identification technologies, such as the following: APP-ID (e.g., App ID) for accurate application identification, User-ID for user identification (e.g., by user or user group), and Content-ID for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provide higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency).

However, a significant challenge for security detection techniques is to efficiently identify an application. Existing application identification techniques are typically implemented using a deterministic finite automaton (e.g., application identification (App ID) applied to flow state matching).

Overview of Techniques for Reduction and Acceleration of a Deterministic Finite Automaton Thus, what are needed are new and improved techniques for reduction and acceleration of a deterministic finite automaton.

Accordingly, various techniques for reduction and acceleration of a deterministic finite automaton (DFA) are disclosed. For example, the disclosed techniques can facilitate reduction (e.g., data storage reduction/compression) and acceleration (e.g., performance lookup acceleration) of a DFA in various environments and regex/pattern matching applications as will be further described below.

As discussed above, existing application identification techniques are typically implemented using a deterministic finite automaton (e.g., application identification (App ID) applied to flow state matching). These example DFA/state tables and/or other example DFA state tables can often have sufficient common states. In such cases, the disclosed techniques for reduction and acceleration of a DFA can be applied to facilitate a storage compression and performance improvement for such processing operations implemented in hardware or a combination of software and hardware (e.g., example processing operations include regex/pattern matching applications, such as pattern matching for malware detecting based on patterns/signatures such as application identification applied to flow state matching).

In some embodiments, a system, process, and/or computer program product for reduction and acceleration of a DFA includes receiving an input value; performing a reduced deterministic finite automaton lookup using a lookup key, in which the lookup key comprises a current state and the input value; and determining a next state based on the lookup key. For example, a deterministic finite automaton can be reduced using a bitmap table, a rule table, and a default state table, and the bitmap table, the rule table, and the default state table can be stored using on-chip memory of a processor, such as further described below with respect to various embodiments.

In one embodiment, a system, process, and/or computer program product for reduction and acceleration of a DFA further includes storing a bitmap table. In one embodiment, a system, process, and/or computer program product for reduction and acceleration of a DFA further includes storing a default state table. In one embodiment, a system, process, and/or computer program product for reduction and acceleration of a DFA further includes storing a rule table.

In one embodiment, a system, process, and/or computer program product for reduction and acceleration of a DFA further includes performing a lookup in a bitmap table using the lookup key to determine whether to obtain the next state from a default state table or from a rule table.

In one embodiment, a system, process, and/or computer program product for reduction and acceleration of a DFA further includes receiving an update that includes a bitmap table, a default state table, and/or a rule table. For example, the update can include updated versions of the bitmap table, the rule table, and the default state table.

In one embodiment, a system, process, and/or computer program product for reduction and acceleration of a DFA further includes reducing the DFA by translating the DFA into a bitmap table, a default state table, and a rule table. For example, the default state table can include a default state (e.g., a most common state) for each current state in a state table, and the bitmap table can include an offset into the rule table for each current state in the state table based on the current state and the input value. The bitmap table, the default state table, and the rule table and the reduced DFA lookup process are further described below.

For example, the disclosed techniques for reduction and acceleration of a DFA can be applied to efficiently compress a DFA table by determining common values and translating the DFA table into a bitmap table, a default state table, and a rule table. In an example implementation, the disclosed techniques for reduction and acceleration of a DFA can be applied to application identification pattern matching performed by a data appliance and/or to any generic DFA, such as further described below.

The disclosed techniques for reduction and acceleration of a DFA can be implemented in hardware or a combination of hardware and software. In one embodiment, the disclosed techniques for reduction and acceleration of a DFA are implemented in hardware. In one embodiment, the disclosed techniques for reduction and acceleration of a DFA are implemented in a combination of hardware and software.

In an example implementation, the disclosed techniques can be implemented in computing hardware by storing a bitmap table, a default state table, and a rule table utilizing on-chip memory (e.g., a general processor with on-chip memory or an ASIC or FPGA with on-chip memory). For example, an FPGA can be implemented that stores a bitmap table, a default state table, and a rule table and performs the RDFA lookup process as described herein.

These and other aspects of the disclosed techniques for reduction and acceleration of a DFA will now be further described below.

Example Network Architecture for a Data Appliance

FIG. 1 is a functional diagram of a network architecture for a data appliance in accordance with some embodiments. For example, such an environment can detect and prevent malware from causing harm (e.g., malicious software can include any executable program, such as active content, executable code, and scripts, that can interfere with the operation of a computing device or computer network, attempt unauthorized access of data or components of a computing device, and/or perform various other malicious, unauthorized, and/or undesirable activities). In particular, a variety of attempts by a malicious individual to propagate malware (e.g., malware 130) via system 120 are described, as are techniques for thwarting that propagation or execution of such malware in protected network computing environments, such as for protecting computing devices within an enterprise network 110.

In the example shown in FIG. 1, devices 104A, 104B, and 104C are client devices (e.g., a laptop computer, a desktop computer, a tablet, a smart phone, and/or other types of client devices) present in an enterprise network 110. A data appliance 102 is configured to enforce policies regarding communications between clients, such as clients 104A and 104B, and nodes outside of enterprise network 110 (e.g., reachable via external network 118, such as the Internet). Examples of such policies include ones governing traffic shaping, quality of service, and routing of traffic. Other examples of policies include security policies (e.g., firewall policies) such as ones requiring the scanning for threats in incoming (and/or outgoing) email attachments, website downloads, files exchanged through instant messaging programs, and/or other file transfers. In some embodiments, appliance 102 is also configured to enforce policies with respect to traffic that stays within enterprise network 110.

Data appliance 102 can take a variety of forms. For example, appliance 102 can be a dedicated device or set of devices. The functionality provided by appliance 102 can also be integrated into or executed as software on a general purpose computer, a computer server, a gateway, and/or a network/routing device. For example, in some embodiments, services provided by data appliance 102 are instead (or in addition) provided to client 104A by software executing on client 104A, such as host agent (IIA) 114 as shown in FIG. 1.

Whenever data appliance 102 is described as performing a task, a single component, a subset of components, or all components of appliance 102 may cooperate to perform the task. Similarly, whenever a component of appliance 102 is described as performing a task, a subcomponent may perform the task and/or the component may perform the task in conjunction with other components. In various embodiments, portions of appliance 102 are provided by one or more third parties. Depending on factors such as the amount of computing resources available to appliance 102, various logical components and/or features of appliance 102 may be omitted and the techniques described herein adapted accordingly. Similarly, additional logical components/features can be added to appliance 102 as applicable.

As will be described in more detail below, appliance 102 can be configured to perform malware analysis/prevention. As another example, cloud security service 122 can provide updates 124 (e.g., malware signatures, software, and/or configuration updates) to appliance 102 (e.g., as part of a subscription service). Example updates that can be provided from cloud security service 122 to appliance 102 for implementing the disclosed techniques for reduction and acceleration of a DFA will be further described below. In an example implementation, appliance 102 can be implemented using a commercially available firewall appliance provided by Palo Alto Networks, Inc., and the cloud security service can be implemented using a commercially available security service, such as the WildFire™ cloud-based malware analysis environment provided by Palo Alto Networks, Inc.

Example Components of a Data Appliance

Figure 2:
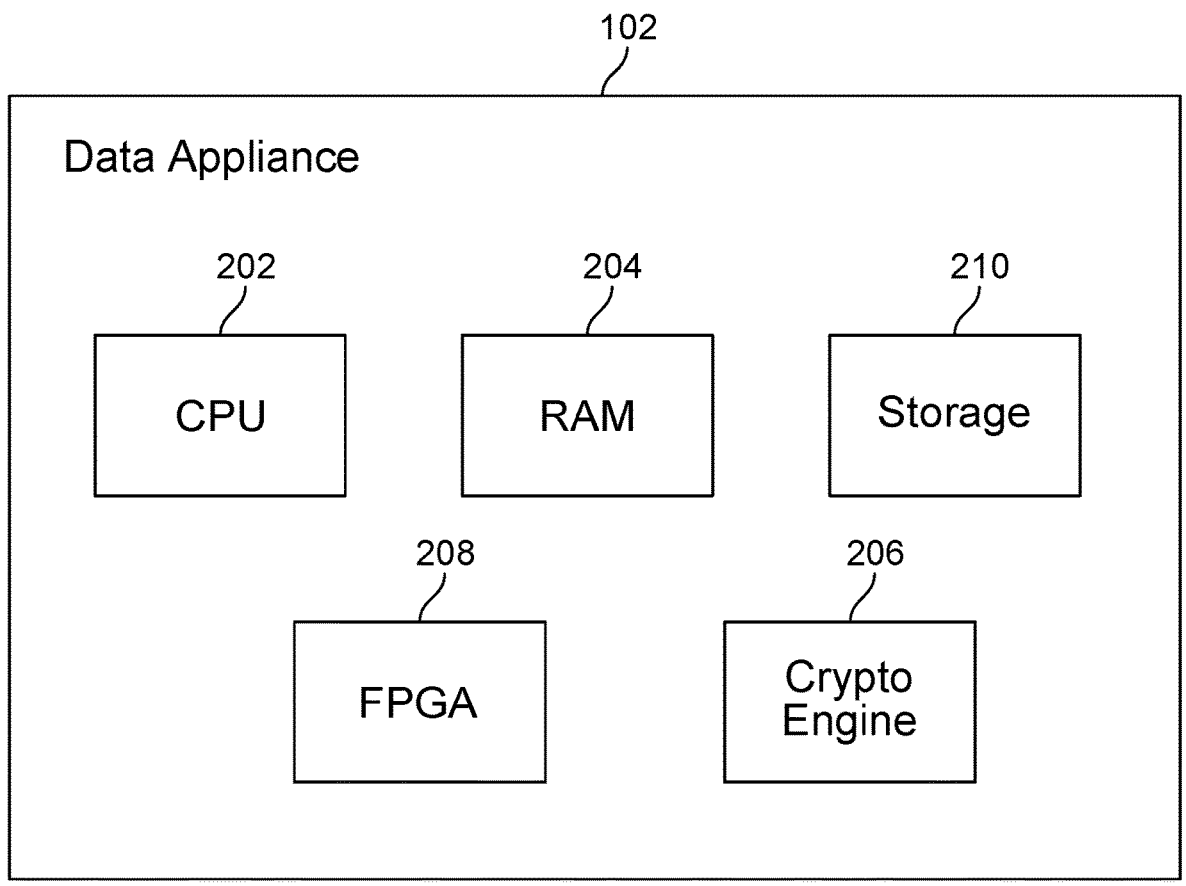
FIG. 2 illustrates a data appliance in accordance with some embodiments.

FIG. 2 illustrates a data appliance in accordance with some embodiments. The example shown is a representation of physical components that are included in data appliance 102, in some embodiments. Specifically, data appliance 102 (e.g., a device that performs various security related functions, such as a security device, which can be in the form of, for example, a security appliance, security gateway, security server, and/or another form of a security device) includes a high performance multi-core CPU 202 and RAM 204. Data appliance 102 also includes a storage 210 (such as one or more hard disks), which is used to store policy and other configuration information. Data appliance 102 can also include one or more optional hardware accelerators. For example, data appliance 102 can include a cryptographic component 206 configured to perform encryption and decryption operations, and one or more FPGAs 208 configured to perform matching (e.g., pattern matching, such as for application identification (App ID) as further described below with respect to FIG. 3), act as network processors, and/or perform other tasks.

Figure 3:
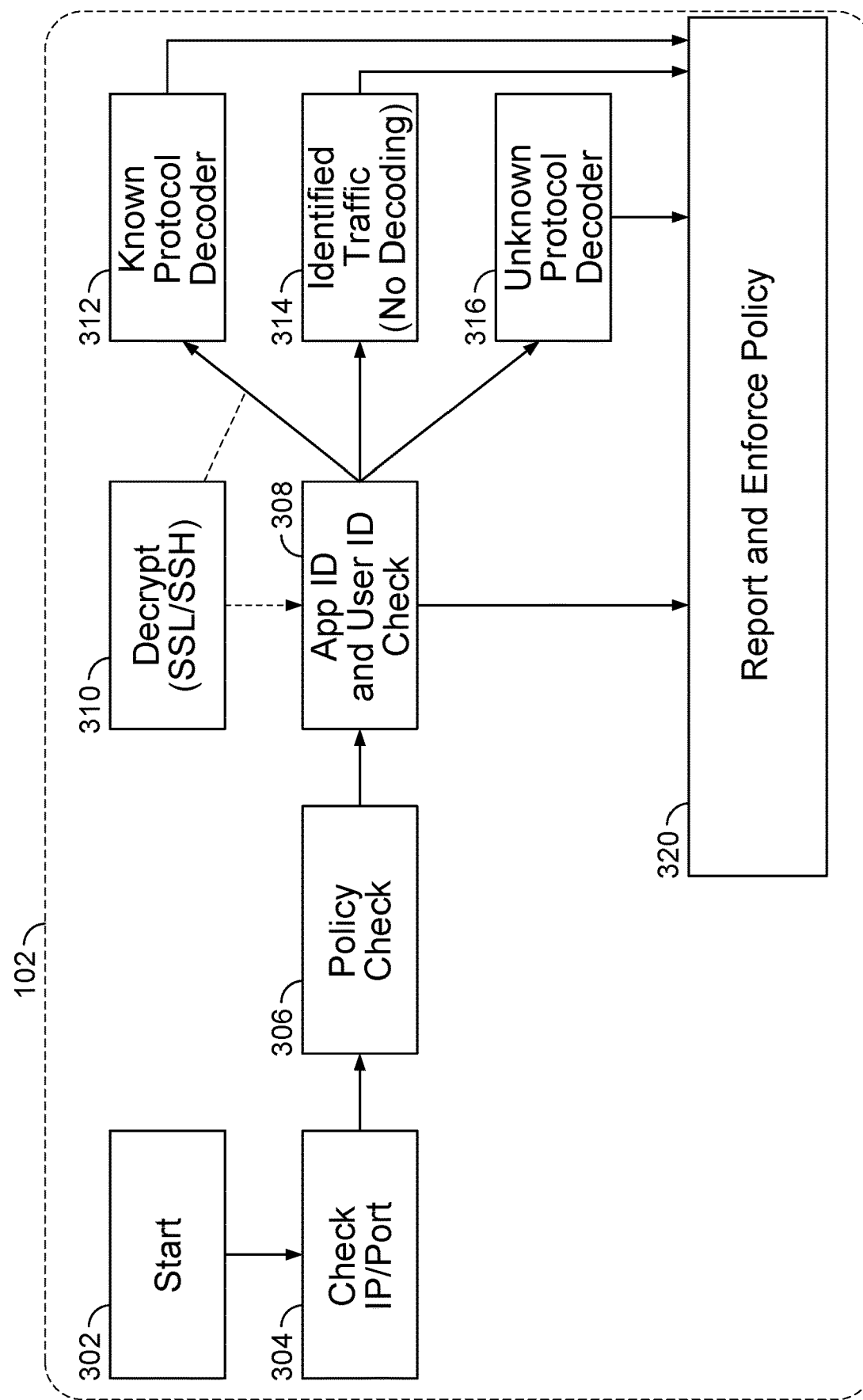
FIG. 3 is a functional diagram of an architecture of a data appliance that can utilize the disclosed techniques for reduction and acceleration of a deterministic finite automaton in accordance with some embodiments.

FIG. 3 is a functional diagram of an architecture of a data appliance that can utilize the disclosed techniques for reduction and acceleration of a deterministic finite automaton in accordance with some embodiments. As shown in FIG. 3, network traffic is monitored at data appliance 102. In one embodiment, network traffic is monitored using a data appliance (e.g., a data appliance that includes security functions, such as a security device/appliance that includes a firewall). In one embodiment, network traffic is monitored using a gateway (e.g., a gateway that includes security functions, such as a security gateway/network gateway firewall). In one embodiment, the network traffic is monitored using pass through (e.g., in-line) monitoring techniques.

In one embodiment, network traffic is monitored using a state-based firewall. In one embodiment, the state-based firewall can monitor traffic flows using an application (app) identifier (ID) component (e.g., APP-ID (App ID) engine, shown as App ID Check & User ID Check 308 in FIG. 3). For example, the monitored network traffic can include HTTP traffic, HTTPS traffic, FTP traffic, SSL traffic, SSH traffic, DNS requests, unclassified application traffic (e.g., unknown application traffic), and/or other types of traffic (e.g., traffic using other types of known or unknown protocols).

As shown in FIG. 3, network traffic monitoring begins at 302. An IP address and port component 304 determines an IP address and port number for a monitored traffic flow (e.g., a session) based on packet analysis. A policy check component 306 determines whether any policies can be applied based on the IP address and port number. As also shown in FIG. 3, an App ID Check & User ID Check 308 identifies an application and a user. For example, the application can be identified using an App ID component (308) using various application signatures for identifying applications based on packet flow analysis (e.g., implemented using an FPGA, such as FPGA 208 as shown in FIG. 2). The user identification can also be determined based on a source IP address (e.g., based on one or more IP addresses). In this example, the App ID component (308) can be configured to determine what type of traffic the session involves, such as HTTP traffic, HTTPS traffic, FTP traffic, SSL traffic, SSH traffic, DNS requests, unknown traffic, and various other types of traffic, and such classified traffic can be directed to an appropriate decoder, such as decoders 312, 314, and 316, to process the classified traffic for each monitored session's traffic flow.

As also shown in FIG. 3, if the monitored traffic is encrypted (e.g., encrypted using HTTPS, SSL, SSH, or another known encryption protocol), then the monitored traffic can be decrypted using a decrypt component 310 (e.g., applying trusted man-in-the-middle techniques using a self-signed certificate associated with the network device, such as a data appliance, gateway, or other network device implementing the firewall). A known protocol decoder component 312 decodes and analyzes traffic flows using known protocols (e.g., applying various signatures for the known protocol) and reports the monitored traffic analysis to a report and enforce policy component 320. Identified traffic (no decoding required) component 314 reports the identified traffic to the report and enforce policy component 320. An unknown protocol decoder component 316 decodes and analyzes traffic flows (e.g., applying various heuristics) and reports the monitored traffic analysis to the report and enforce policy component 320.

In one embodiment, the results of the various traffic monitoring techniques using known protocol decoder component 312, identified traffic component 314, and unknown protocol decoder component 316 described above are provided to report and enforce policies component 320 (e.g., network/routing policies, security policies, and/or firewall policies). For example, firewall policies can be applied to the monitored network traffic using application identification, user identification, and/or other information to match signatures (e.g., application/APP ID signatures such as further described below, as well as file-based, protocol-based, and/or other types/forms of signatures for detecting malware or suspicious behavior).

In one embodiment, data appliance 102 also includes a content-ID component (not shown). In one embodiment, the content-ID component's identified content is also used by report and enforce policy component 320, possibly in various combinations with other information, such as application, user, and/or other information, to enforce various security/firewall policies/rules.

In an example implementation, the App ID component (308) of data appliance 102 can be implemented using the disclosed techniques for reduction and acceleration of a deterministic finite automaton (DFA) (e.g., in which the DFA is utilized as a type of state transition structure that is used to represent the App ID patterns) as further described below. As such, FIGS. 1-3 are provided as example environments and example applications that can benefit from implementing the disclosed techniques for reduction and acceleration of a deterministic finite automaton. As discussed above, the disclosed techniques for reduction (e.g., data storage reduction/compression) and acceleration (e.g., performance lookup acceleration) of a DFA can be similarly applied to other environments and other regex/pattern matching applications.

Techniques for Reduction And Acceleration of a Deterministic Finite Automaton

A variety of techniques for reduction and acceleration of a deterministic finite automaton (DFA) are disclosed. In one embodiment, the disclosed techniques for reduction and acceleration of a DFA can be applied to the data appliance described above with respect to FIGS. 1-3 for improving the performance of various pattern matching processing operations (e.g., application identification (App ID) and/or other pattern matching processing operations). These and other aspects of the techniques for reduction and acceleration of a DFA will now be further described below.

FIG. 4 is a full representation of an example deterministic finite automaton table. As shown in FIG. 4, a table 402 is a full representation of an example DFA state transition table as further described below.

As similarly described above, the DFA provides a type of state transition structure that can be used to represent the App ID patterns or can be applied to other pattern matching applications. In one embodiment, the disclosed techniques provide a mechanism to reduce the DFA memory footprint, and that reduction facilitates the use of various techniques (e.g., hardware-based techniques and/or combinations of software and hardware-based techniques) to accelerate a lookup process (e.g., to improve an App ID performance of a data appliance, such as data appliance 102 as shown in FIGS. 1-3) as further described below.

FIG. 5 is a full representation of the example deterministic finite automaton table that is modified to indicate valid next states and default next states in accordance with some embodiments. As shown in FIG. 5, a table 502 is a full representation of the example DFA state transition table that is modified (e.g., highlighting relevant entries in the example DFA state transition table, in which such cells are indicated with a different indicator) to indicate the valid next states, and the cells indicating the default next states are not modified in table 502, as further described below.

In an example implementation, a DFA lookup key includes a specification of a current state and an input character byte (e.g., [current-state, input-character]), and a next state pointer is returned for each lookup. For example, for a given network flow of 1000 bytes, the state transition table is iteratively looked up using the current state and the input character byte, and the DFA returns a next state pointer. In this example, the lookup process continues until a terminal/pattern-match state is discovered or until the flow bytes are exhausted.

The lookup operation is illustrated as shown below.

next_state=DFA[current_state, input_char]

From inspecting these example DFAs (e.g., for App ID pattern matching), it is evident that most transitions from a certain "current_state" is to the same next state pointer. There are only a few dissenting (e.g., uncommon) next-state transitions for a given state. These dissenting next-state pointers are referred to herein as valid next states, and the common (e.g., most occurring) next-state pointer is referred to herein as the default next state.

Referring to FIG. 5, the highlighted cells (e.g., cells indicated with a different indicator) in table 502 are the valid next states, whereas the other states are the default next state.

Figure 6:
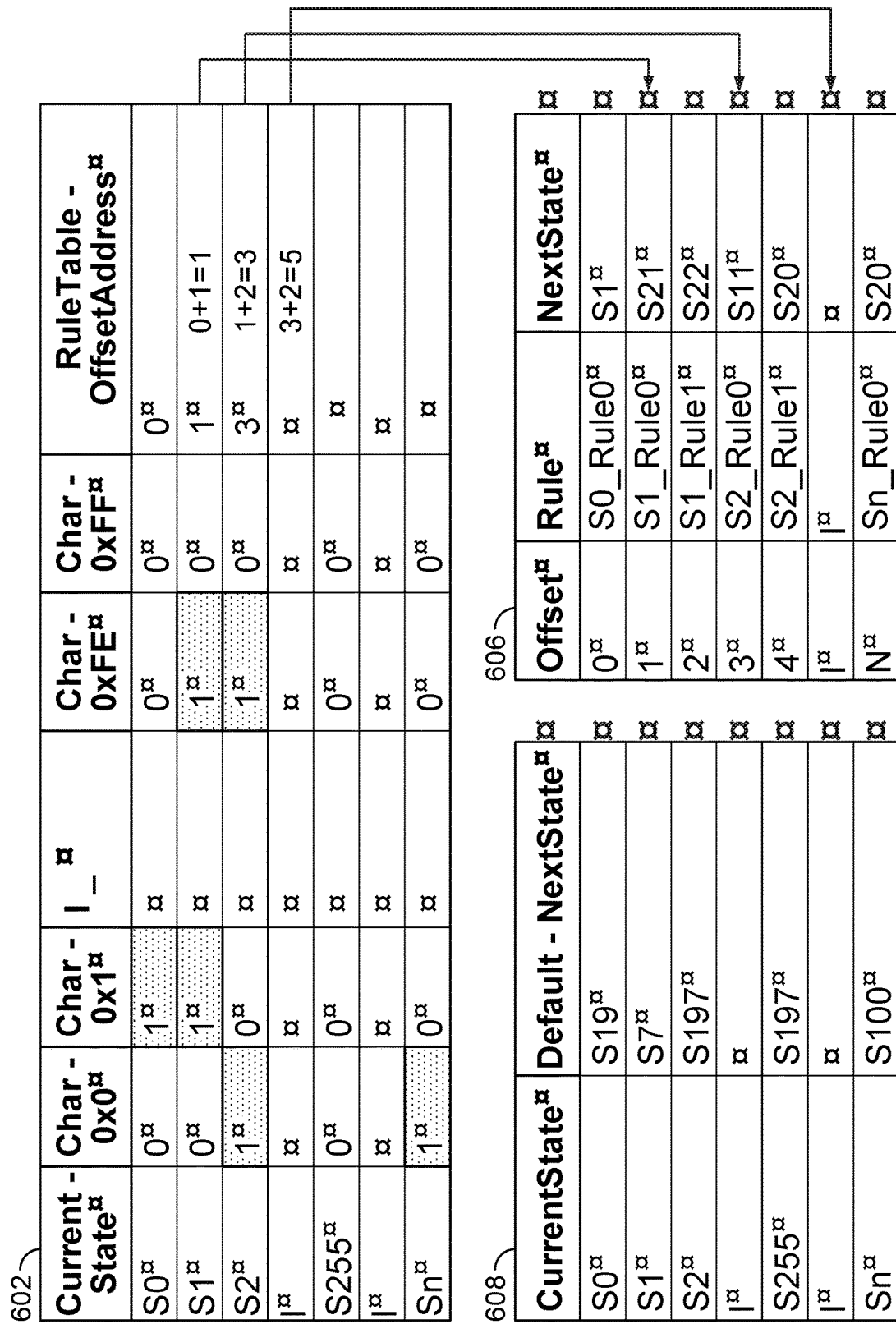
FIG. 6 is a representation of a bitmap table, default state table, and a rule table in accordance with some embodiments.

FIG. 6 is a representation of a bitmap table, default state table, and a rule table in accordance with some embodiments. As shown in FIG. 6, table 602 is a representation of a bitmap table, table 608 is a representation of a default state table, and table 606 is a representation of a rule table that are generated based on the example DFA state transition table (402) for providing a reduced/compressed representation of the DFA as further described below.

In one embodiment, the DFA state transition table (402) is reduced (e.g., data storage requirements are reduced/compressed) by translating the DFA state transition table (402) into three new data structures (e.g., which require less data storage). Each of these new data structures are further described below.

In one embodiment, the bitmap table (602) shows if an entry of the DFA is a default state or a valid next state. The bitmap table is similar in construction to DFA table 502, but uses 1 bit value to indicate whether the next state is a valid state (1) or a default state (0). The bitmap table 602 also contains a RuleTable OffsetAddress field for each current state. If the lookup into the bitmap table results in a 1, then the valid next state is looked up into the Rule Table. The offset into the RuleTable is calculated as follows: OffsetAddress[n]=OffsetAddress[n−1]+sum_of_1s[n−1], that is, the Rule Table lookup address equals the RuleTableOffset value from the bitmap table, for the current state, plus the number of 1s to the left of the bitmap lookup entry.

In one embodiment, the default state table (608) shows a default next state for a current state. For example, the most common next state pointer from each state of the DFA can be extracted and stored in the default state table. If the result of the bitmap table lookup is a 0, the default next pointer from the default state table is returned as the next state.

In one embodiment, the rule table (606) shows the valid next states from each state. For example, the valid next states from each state are stored in this table. If the result of the bitmap table lookup is a 1, then the next state is determined based on a lookup in the rule table. The total number of entries in the rule table is equal to the sum of 1's (e.g., indicated as, for example, highlighted) in the bitmap table 602).

Figure 7:
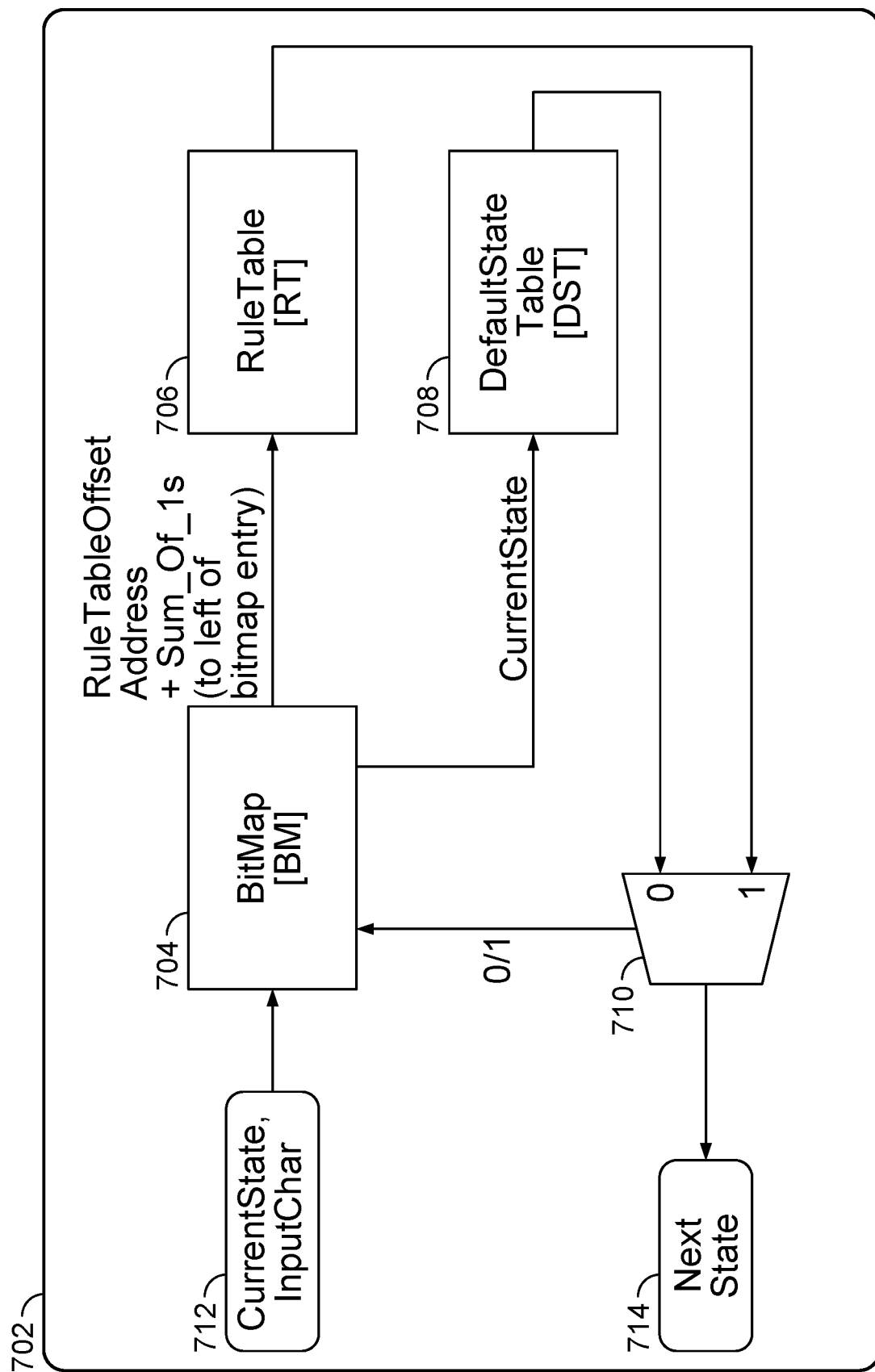
FIG. 7 is a functional diagram of a reduced deterministic finite automaton (RDFA) lookup mechanism in accordance with some embodiments.

FIG. 7 is a functional diagram of a reduced deterministic finite automaton (RDFA) lookup mechanism in accordance with some embodiments. Referring to FIG. 7, a reduced deterministic finite automaton (RDFA) lookup mechanism 702 includes a BitMap (BM) 704, a Rule Table (RT) 706, a Default State Table (DST) 708 (e.g., each of the tables 704, 706, and 708 can be stored in distinct storage components or can be stored in a single storage component, such as on-chip memory of a processor), and a next state output component 710 (e.g., a selector logical component). In an example implementation, an RDFA lookup mechanism can be implemented in software on a processor. An example of pseudo code for such an RDFA lookup mechanism is provided further below.

In one embodiment, each of components 704, 706, and 708 stores the respective tables as similarly described above. For example, BM 704 can store bitmap table 602, RT 706 can store rule table 606, and DST 708 can store default state table 608.

Referring to FIG. 7, the disclosed reduced DFA scheme is performed using a lookup key 712, which includes a current state (CurrentState) and an input character (InputChar) as similarly described above, to perform a lookup in the BitMap (BM) structure shown at 704. If the BM entry is a 0, then the value from the Default State Table (DST) shown at 708 is returned as the next state (next_state pointer). If the BM entry is a 1, then a lookup is issued to the Rule Table (RT) shown at 706 to determine the next state (next_state pointer). Based on the lookup in RT 706 or DST 708, the next state output component shown as 710 provides a next state output 714 (e.g., next_state pointer) as shown.

For example, the disclosed techniques for reduction and acceleration of a deterministic finite automaton can reduce the size of the DFA table(s) (e.g., using BM, RT, and DST as described above) to facilitate efficient serial look-up operations to be performed on computer processing hardware as these tables can be stored internally on computer processing hardware, such as a CPU, FPGA, or ASIC (e.g., internal SRAM or EDRAM), rather than having to perform external memory lookups (e.g., DDR3, DDR4, RDRAM, or some other type of external memory, which is generally inefficient for pattern matching operations that perform serial lookup operations as external memory is typically operating at a slower rate than the processor, such as a CPU, FPGA, or ASIC). In example implementations, the disclosed techniques can provide for approximately ten times (10×) the performance (e.g., based on hardware configurations).

In one embodiment, the disclosed techniques for reduction and acceleration of a deterministic finite automaton can be used to compress any generic DFA. In an example implementation, the disclosed techniques for reduction and acceleration of a deterministic finite automaton can be implemented for App ID pattern matching for a security data appliance as similarly described above with respect to FIGS. 1-3. In this example, periodic (e.g., daily, weekly, or some other interval) updates can be provided (e.g., from cloud security service 122 to data appliance 102 as shown in FIG. 1) to send newly compiled bitmap, default state, and rule tables (e.g., as new apps are identified, and/or other changes, in which the DFA state table is automatically translated into the compiled bitmap, default state, and rule tables as similarly described herein and as provided in the example pseudo code provided further below).

Additional example processes for the disclosed techniques for reduction and acceleration of a deterministic finite automaton will now be described.

Processes for Reduction and Acceleration of a Deterministic Finite Automaton

Figure 8:
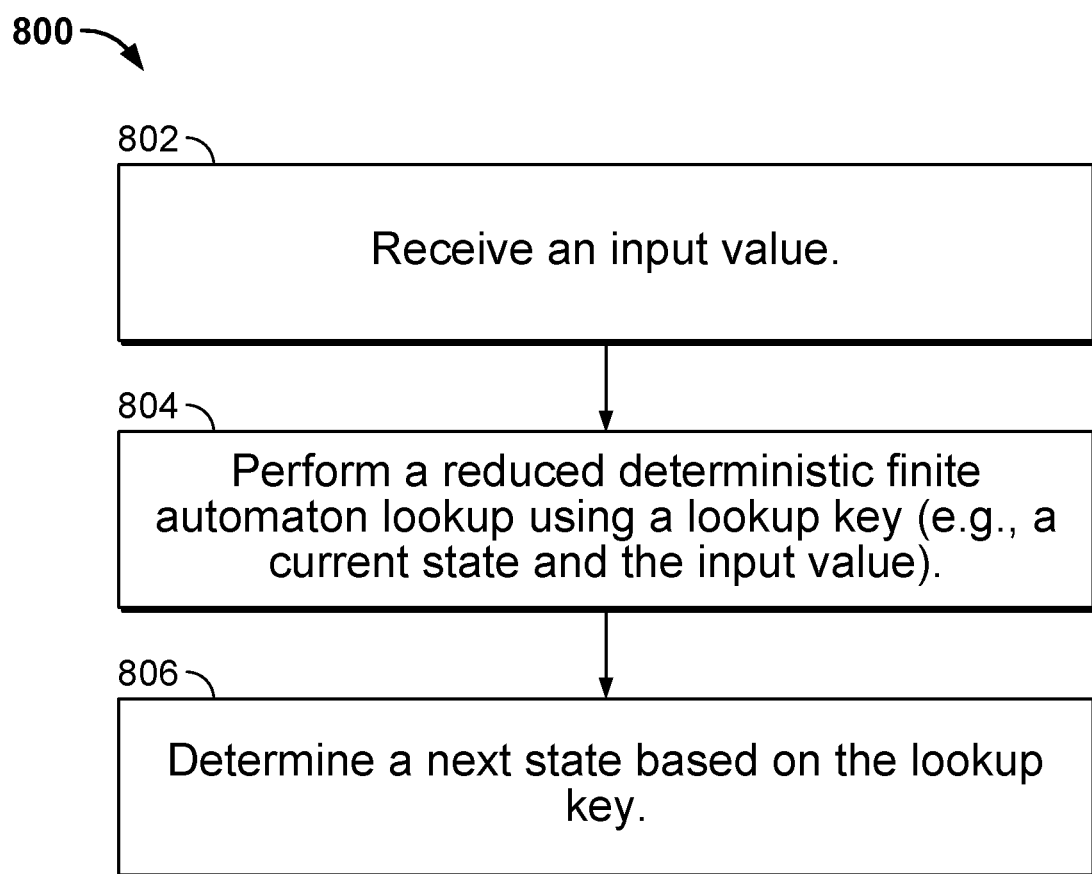
FIG. 8 is a flow diagram of a process for reduction and acceleration of a deterministic finite automaton in accordance with some embodiments.

FIG. 8 is a flow diagram of a process for reduction and acceleration of a deterministic finite automaton in accordance with some embodiments. In some embodiments, a process 800 as shown in FIG. 8 is performed by the platform and techniques as similarly described above including the embodiments described above with respect to FIGS. 1-7. In one embodiment, process 800 is performed by data appliance 102 as described above with respect to FIGS. 1-3.

The RDFA lookup process begins at 802 when an in input value is received.

At 804, a reduced deterministic finite automaton lookup using a lookup key is performed. For example, the lookup key can include a current state and the input value as similarly described above.

At 806, a next state based on the lookup key is determined. For example, the next state can include a next state pointer as similarly described above.

Figure 9:
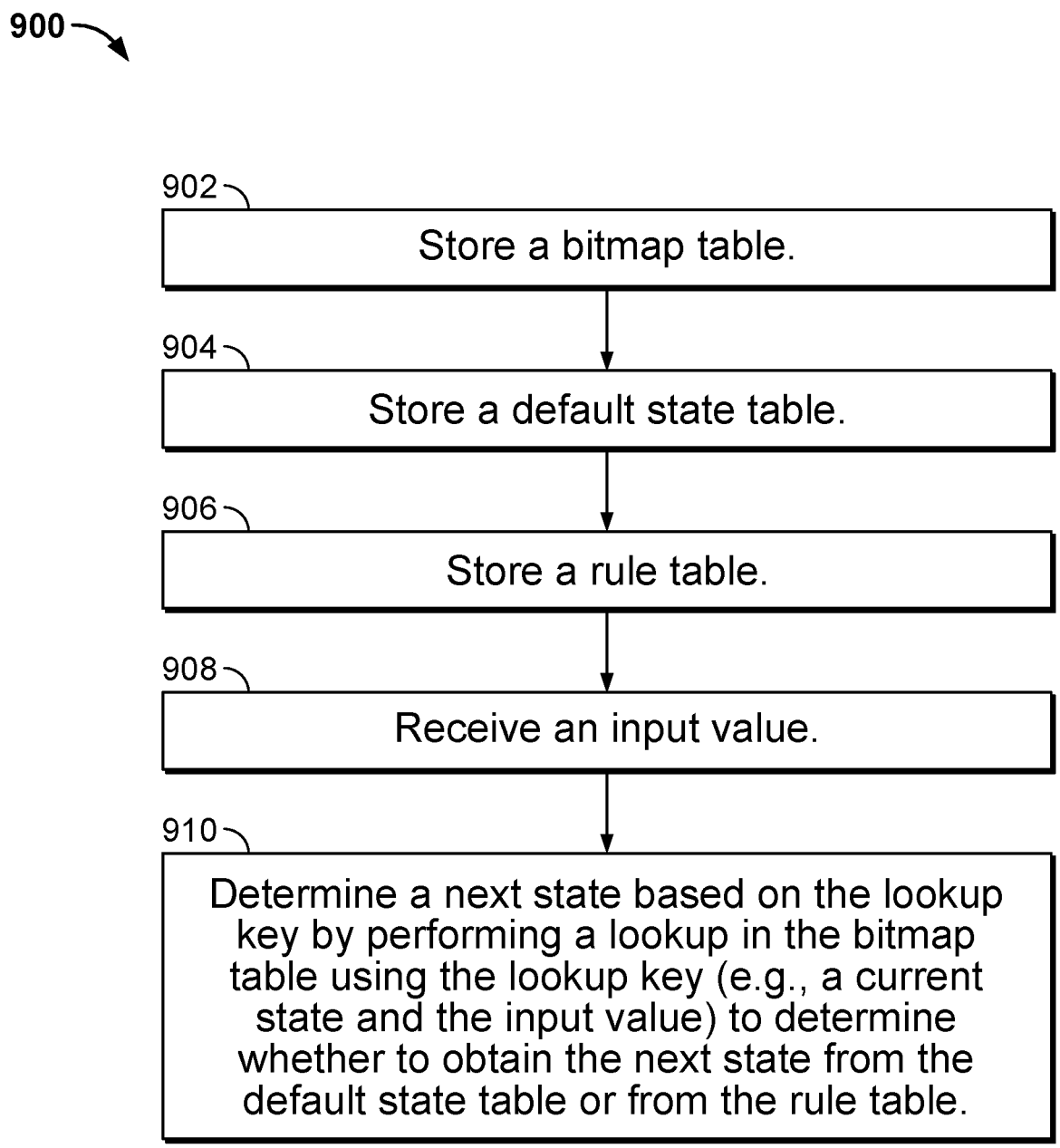
FIG. 9 is another flow diagram of a process for reduction and acceleration of a deterministic finite automaton in accordance with some embodiments.

FIG. 9 is another flow diagram of a process for reduction and acceleration of a deterministic finite automaton in accordance with some embodiments. In some embodiments, a process 900 as shown in FIG. 9 is performed by the platform and techniques as similarly described above including the embodiments described above with respect to FIGS. 1-7. In one embodiment, process 900 is performed by data appliance 102 as described above with respect to FIGS. 1-3.

An RDFA initialization process begins at 902 when a bitmap table is stored. At 904, a default state table is stored. At 906, a rule table is stored.

An RDFA lookup process begins at 908 when an in input value is received.

At 910, a lookup in the bitmap table is performed using a lookup key to determine whether to obtain the next state from a default state table or from a rule table. For example, the lookup key can include a current state and the input value, and the next state can include a next state pointer, as similarly described above.

Figure 10:
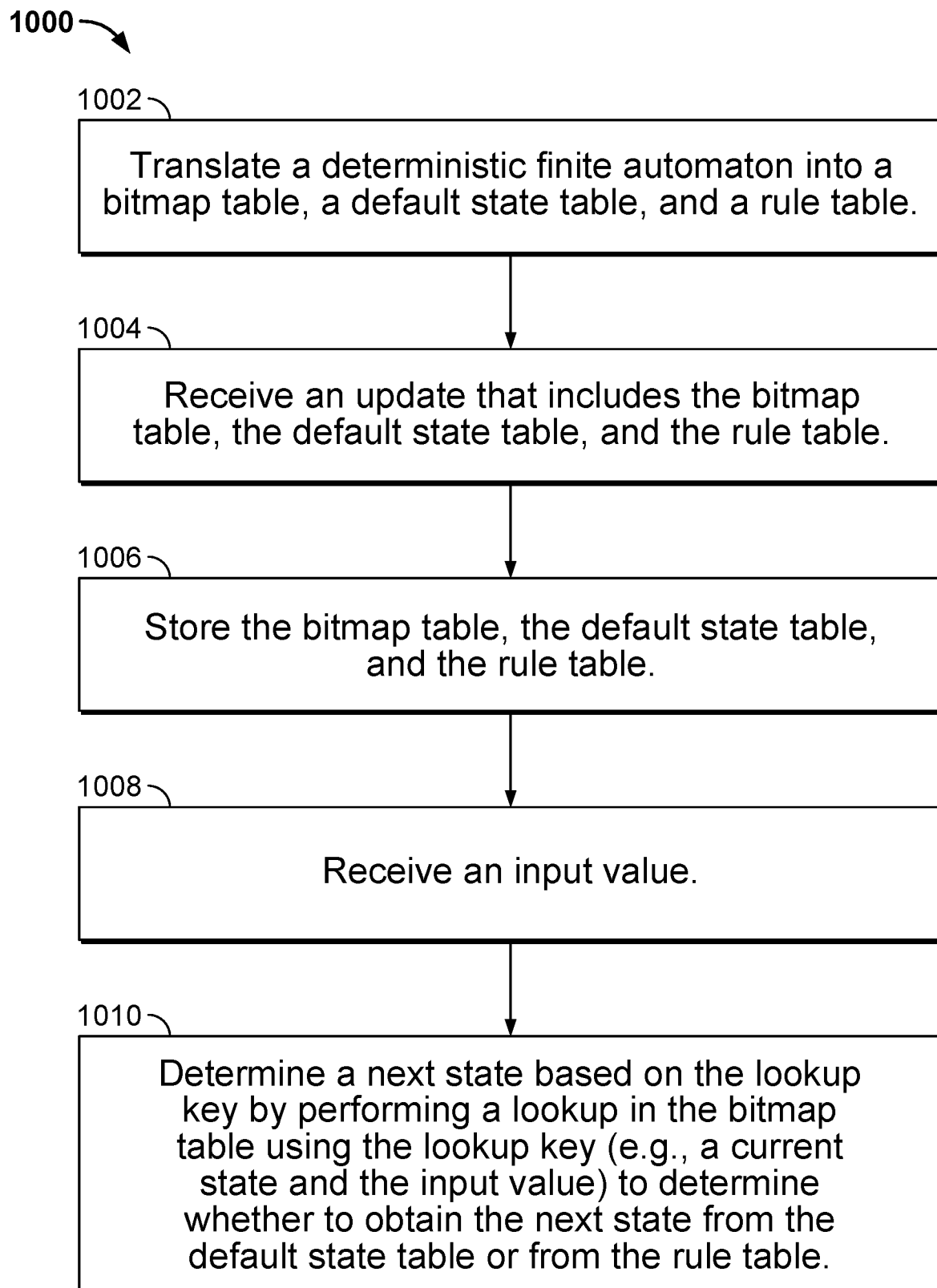
FIG. 10 is another flow diagram of a process for reduction and acceleration of a deterministic finite automaton in accordance with some embodiments.

FIG. 10 is another flow diagram of a process for reduction and acceleration of a deterministic finite automaton in accordance with some embodiments. In some embodiments, a process 1000 as shown in FIG. 10 is performed by the platform and techniques as similarly described above including the embodiments described above with respect to FIGS. 1-7. In one embodiment, process 1000 is performed by data appliance 102 as described above with respect to FIGS. 1-3.

An RDFA translation process begins at 1002 when a deterministic finite automaton is translated to a reduced deterministic finite automaton. For example, the deterministic finite automaton can be translated into a bitmap table, a default state table, and a rule table as similarly described above (e.g., the RDFA translation process can be performed by cloud security service 122 as shown in FIG. 1).

An RDFA initialization process begins at 1004 when an update is received that includes the bitmap table, the default state table, and the rule table (e.g., data appliance 102 can receive updates 124 that include the updated versions of the compiled bitmap table, default state table, and rule table from cloud security service 122 as shown in FIG. 1). At 1006, each of the bitmap table, default state table, and rule table are stored.

An RDFA lookup process begins at 1008 when an input value is received.

At 1010, a lookup in the bitmap table is performed using a lookup key to determine whether to obtain the next state from a default state table or from a rule table. For example, the lookup key can include a current state, and the input value and the next state can include a next state pointer, as similarly described above.

Example pseudo code for DFA compression and for a reduced DFA (RDFA) lookup process as similarly described above will now be described.

Example Pseudo Code for DFA Compression

Example pseudo code for performing DFA compression to effectively convert a DFA to a reduced DFA by translating an example DFA table to a bitmap table, a default state table, and a rule table to facilitate the disclosed techniques for reduction and acceleration of a deterministic finite automaton is provided below (e.g., in which the below example pseudo code is essentially written in Python code format).

```
# RDFA pseudo code

# NOTE:
# This is essentially in python code format
# (#)s represent single line comments
# (""")s represent multi-line comments
######### Converting DFA to Reduced-DFA ###############
# Required Structures
ST = [[ ]] # StateTable
RT = [ ] # RuleTable
DT = [ ] # DefaultTable
BM = [ ] # BitMap
RTO = [ ] # RuleTableOffset
def process_dfa(input_dfa_file):
    """Process DFA
    input_dfa_file is a normal DFA state table represented in CSV format.
```

For example, this is how it looks. For every CurrentState, there is a corresponding NextState depending on the input character byte.

In this example, we use a 2-byte NextState pointer and bit[15] (16th bit/Most-significant-bit) is used to indicate if the NextState pointer is a pattern match.

CurrState, NextState(in_char 0x00), NextState(in_char 0x01), NextState(in_char 0x02), . . . NextState(in_char 0xFF)

| 0,    | 12,  | 25, | 12,    | 0x8012, |
| 1,    | 156, | 23, | 23,    | 14,     |
| ....  |      |     |        |         |
| 255,  | 0,   | 37, | 0x8023, | 99,    |
| """   |      |     |        |         |

```
    fname = input_dfa_file
    redux(fname)
    write_output_files( )
def redux(fname):
```

-continued

```
'''DFA Reduction
1. Read the state table csv from the file and populate ST
2. Reduce ST into DefaultTable(DT), RuleTable(RT), and
RuleTableOffset (RTO)
3. Create a BitMap(BM) using RT
'''
# 1. Read each line from the input file and store it
# in a StateTable (ST) array
curr_st = 0
with open(fname) as f:
    for line in f:
        ST[curr_st] = line
        curr_st += 1
# 2. Create DefaultStateTable (DT) by extracting most
# .. common state from each ST entry
DT = [max(set(st), key=st.count) for st in ST]
# Create RuleTable (RT)
# Parse each state in the StateTable (ST) and iterate through
# each of the 256 NextState pointers. If the NextState pointer
# is not the same value as the Defaultstate for that State, then
# push that NextState pointer into the RuleTable (RT)
for curr_state in range(len(ST)):
    for char in range(len(ST[curr_state])):
        if ST[curr_state][char] != DT[curr_state]:
            RT.append({(curr_state, char):ST[curr_state][char]})
# 3. Create BitMap from RT
bitmap( )
def bitmap(self):
    '''BitMap structure
    The BitMap is a 2D bit-representation of the StateTable.
    Hence its size is N*256, where N is the number of states
    in the DFA and 256 represents the number of characters
    (0x0 to 0xFF).
    S0 - [[0,0,1 ... 0],
    S1 - [0,1,0 ... 1],
    S2 - [0,1,0 ... 1],
    .. - [...]
    Sn - [0,0,0 ... 1]]
    How is the BitMap populated?
    For each state, a character position is set to 1 if that
    (state, char) entry exists in the RuleTable. That is,
    if ST[state][char] != DT[state] -> set BitMap[state][char]
    '''
    # Initialize Bitmap and RuleTableOffset array
    BM = [256*[0] for i in range(len(ST))]
    RTO = [0 for i in range(len(ST))]
    # Set Bitmap
    for u_rt in RT:
        for cs, c in u_rt:
            # uppermost bit is final state indicator, not a state-bit
            # hence mask it out before filling BM
            BM[cs & 0x7FFF][c] = 1
    for st in range(len(BM)):
        if st == 0:
            RTO[st] = 0
        else:
            RTO[st] = RTO[st-1] + BM[st-1].count(1)
def write_output_files( ):
    # write DefaultStateTable, RuleTable, RuleTableOffset and BitMap
    to file
    file_write (DT, RT, RTO, BM)
```

Example Pseudo Code for a Reduced DFA (RDFA) Lookup Process

Example pseudo code for performing a reduced DFA lookup process using the disclosed techniques for reduction and acceleration of a deterministic finite automaton is provided below (e.g., in which the below example pseudo code is essentially written in Python code format).

```
######## Reduced-DFA Lookup Process ##################
def dfaLookup(self, cs, c):
    '''Main lookup routine
    input: current state, input char
    output: next state
    1. Lookup in Bitmap(BM). If BM entry
    .. is 0 DefaultTable(DT) result has to be returned
    3. If BitMap=1, lookup HashTable(HT)
    Cache lookup key = (current state, input char)
    BM lookup key = (current state, input char)
    DT lookup key = current state
    HT lookup key = hashLeft & hashRight(current state, input char)
    '''
    # 0. This is an optional step. We could use a LRU cache as the
    # .. first step
    rc = LRU.get((cs,c))
    LRU.set((cs,c), rc)
    # If there is a match in the cache, then return the value
    # else proceed
    if rc != -1:
        return rc
    # 2. Lookup in BM & DT
    rc = BM[cs][c]
    if rc == 0:
        return DT[cs]
    # 3. Lookup in RT
    # Count num of 1s to the left-of and including the current char
    1_count = BM[cs][:c].count(1)
    # index into RT = RTO for current state + num of 1s to the left
    # .. of the current char within the state
    print "Looking up into RT entry", RTO[cs] + 1_count
    return RT[RTO[cs] + 1_count][(cs,c)]
```

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system, comprising:
a processor configured to:
  receive an input value for a deterministic finite automaton, wherein the deterministic finite automaton is reduced by translating the deterministic finite automaton into a bitmap table, a rule table, and a default state table;
  perform a reduced deterministic finite automaton lookup using a lookup key, wherein the lookup key comprises a current state and the input value, comprising to:
    perform a lookup in the bitmap table using the lookup key to determine whether to obtain a next state from the default state table or from the rule table, comprising to:
      determine whether the bitmap table returns a default state or a valid state using the lookup key, the default state corresponding to a most commonly occurring next-state pointer, the default state being different from the valid state; and
      in response to a determination that the bitmap table returns the default state, determine that the next state is to be obtained from the default state table; and
    determine the next state based on the lookup key, comprising to:
      in response to a determination that the next state is to be obtained from the default state table, obtain the next state from the default state table based on the lookup key; and a memory coupled to the processor and configured to provide the processor with instructions.

2. The system recited in claim 1, wherein the deterministic finite automaton is stored using on-chip memory of the processor.

3. The system recited in claim 1, wherein the processor is further configured to:
store the bitmap table.

4. The system recited in claim 1, wherein the processor is further configured to:
store the default state table.

5. The system recited in claim 1, wherein the processor is further configured to:
store the rule table.

6. The system recited in claim 1, wherein performing a lookup in the bitmap table using the lookup key to determine whether to obtain a next state from the default state table or from the rule table further comprises:
determine whether the bitmap table returns a default state or a valid state using the lookup key; and
in response to a determination that the bitmap table returns the valid state, determine that the next state is to be obtained from the rule table.

7. The system recited in claim 6, further comprising:
in response to a determination that the next state is to be obtained from the rule table, obtain the next state from the rule table, comprising to:
determine an offset address based on the current state;
determine an offset based on the offset address and a number of valid states to the left of a bitmap lookup entry; and
determine the next state from the rule table based on the offset and the current state.

8. A method, comprising:
receiving an input value for a deterministic finite automaton, wherein the deterministic finite automaton is reduced by translating the deterministic finite automaton into a bitmap table, a rule table, and a default state table;
performing a reduced deterministic finite automaton lookup using a lookup key executed on a processor, wherein the lookup key comprises a current state and the input value;
performing a lookup in the bitmap table using the lookup key to determine whether to obtain a next state from the default state table or from the rule table, comprising:
determining whether the bitmap table returns a default state or a valid state using the lookup key, the default state corresponding to a most commonly occurring next-state pointer, the default state being different from the valid state; and
in response to a determination that the bitmap table returns the default state, determining that the next state is to be obtained from the default state table; and
determining the next state based on the lookup key, comprising:
in response to a determination that the next state is to be obtained from the default state table, obtaining the next state from the default state table based on the lookup key.

9. The method of claim 8, wherein the deterministic finite automaton is stored using on-chip memory of the processor.

10. The method of claim 8, further comprising:
storing the bitmap table.

11. The method of claim 8, further comprising:
storing the default state table.

12. The method of claim 8, further comprising:
storing the rule table.

13. The method of claim 8, performing a lookup in the bitmap table using the lookup key to determine whether to obtain a next state from the default state table or from the rule table further comprises:
determining whether the bitmap table returns a default state or a valid state using the lookup key; and
in response to a determination that the bitmap table returns the valid state, determining that the next state is to be obtained from the rule table.

14. The method of claim 13, further comprising:
in response to a determination that the next state is to be obtained from the rule table, obtaining the next state from the rule table, comprising:
determining an offset address based on the current state;
determining an offset based on the offset address and a number of valid states to the left of a bitmap lookup entry; and
determining the next state from the rule table based on the offset and the current state.

15. A computer program product, the computer program product being embodied in a tangible non-transitory computer readable storage medium and comprising computer instructions for:
receiving an input value for a deterministic finite automaton, wherein the deterministic finite automaton is reduced by translating the deterministic finite automaton into a bitmap table, a rule table, and a default state table;
performing a reduced deterministic finite automaton lookup using a lookup key, wherein the lookup key comprises a current state and the input value, comprising:
performing a lookup in the bitmap table using the lookup key to determine whether to obtain a next state from the default state table or from the rule table, comprising:
determining whether the bitmap table returns a default state or a valid state using the lookup key, the default state corresponding to a most commonly occurring next-state pointer, the default state being different from the valid state; and
in response to a determination that the bitmap table returns the default state, determining that the next state is to be obtained from the default state table; and
determining the next state based on the lookup key, comprising:
in response to a determination that the next state is to be obtained from the default state table, obtaining the next state from the default state table based on the lookup key.

16. The computer program product recited in claim 15, further comprising computer instructions for:
storing the bitmap table.

17. The computer program product recited in claim 15, further comprising computer instructions for:
storing the default state table.

18. The computer program product recited in claim 15, further comprising computer instructions for:
storing the rule table.

19. The computer program product recited in claim 15, wherein performing a lookup in the bitmap table using the lookup key to determine whether to obtain a next state from the default state table or from the rule table further comprises:
- determining whether the bitmap table returns a default state or a valid state using the lookup key; and
- in response to a determination that the bitmap table returns the valid state, determining that the next state is to be obtained from the rule table.

20. The computer program product recited in claim 19, further comprising:
- in response to a determination that the next state is to be obtained from the rule table, obtaining the next state from the rule table, comprising:
  - determining an offset address based on the current state;
  - determining an offset based on the offset address and a number of valid states to the left of a bitmap lookup entry; and
  - determining the next state from the rule table based on the offset and the current state.

* * * * *

UNITED STATES PATENT AND TRADEMARK OFFICE
CERTIFICATE OF CORRECTION

Page 1 of 1

PATENT NO. : 10,742,609 B2
APPLICATION NO. : 16/127086
DATED : August 11, 2020
INVENTOR(S) : Ganesh et al.

It is certified that error appears in the above-identified patent and that said Letters Patent is hereby corrected as shown below:

In the Specification

In Column 6, Line(s) 26, after "host agent", delete "(IIA)" and insert --(HA)--, therefor.

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*